Patented Aug. 13, 1940

2,211,293

UNITED STATES PATENT OFFICE 2,211,293

PYRAZOLONE DERIVATIVES

Max Schmid, Riehen, Switzerland, assignor to the firm Society of Chemical Industry in Basle, Basel, Switzerland No Drawing. Application July 19, 1939, Serial No. 285,440. In Switzerland November 6, 1935

5 Claims. (Cl. 260—310)

The present invention relates to new intermediate products of the pyrazolone series which are particularly valuable for the production of new dyestuffs. Pyrazolones which are derived from the diphenyl series have already been described and are obtained by tetrazotizing for example benzidine and converting it into the corresponding diphenyldihydrazine by treatment with suitable reducing agents. These hydrazines are then condensed with -ketonic acid esters, for instance ethyl acetoacetate, whereby symmetrical diphenyl derivatives are obtained which are substituted in their two 4-positions by pyrazolone radicals. When trying to obtain such pyrazolones in this manner it is found that the manufacture of the 4:4'-hydrazines of the diphenyl series is difficult and that the yield is poor.

It has now been found that monopyrazolones of the diphenyl series can be obtained in excellent yield and purity when using as starting material amines of the general formula

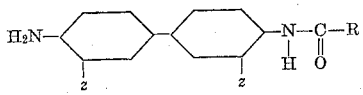

wherein $z$ stands for hydrogen, methyl, methoxy and chlorine and R stands for hydrogen, O-alkyl, alkyl or aryl. These products are easily converted into diazo compounds when treated with mineral acids and akali nitrites, as was to be foreseen offhand. It could however not be anticipated that the diazo compounds thus obtained can be converted into hydrazine sulfonic acids of the general formula

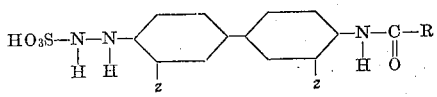

wherein $z$ and R have the aforesaid significance, by treating them first with alkali sulfites, preferably with quantities amounting to at least 1 mol of sodium sulfite, in a feebly alkaline medium whose pH lies advantageously between 7 and 9, and then with reducing agents, for instance iron, zinc or stannous chloride in an acid medium whose pH lies advantageously between 2.5 to 6.5, until the reaction mass is decolorized, excellent yields being obtained thereby. By treating these hydrazine sulfonic acids with saponifying agents, preferably with acids, both the sulfonic groups attached to the hydrazine group and also the carboxylic acid groups attached to the amino group may be split off, the latter generally under energetic conditions, so that by condensing the products thus obtained with -ketonic acid esters, for instance, formylacetic acid ethylester, acetoacetic acid ethylester, ethyl or methyl ester of oxalacetic acid, benzoyl acetic acid ester, terephthaloyl-diacetic ester, chlorobenzoyl acetic ester, nitrobenzoylacetic ester and the like, pyhazolone derivatives are obtained which correspond to the general formula

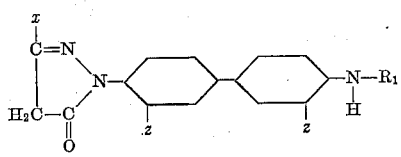

wherein $z$ stands for H, $CH_3$, $OCH_3$ or Cl, $R_1$ stands for hydrogen or the radical of an aliphatic or aromatic carboxylic acid, and $x$ stands for hydrogen, $CH_3$, COOH, O=C—$OR_2$ ($R_2$ standing for $CH_3$ or $C_2H_5$) and phenyl. If in such pyrazolones the symbol $R_1$ represents the radical of a carboxylic acid, the latter may be converted by saponifying agents into such pyrazolone derivatives wherein $R_1$ stands for hydrogen.

The following examples illustrate the invention, the parts being by weight:

Example 1

22.6 parts of finely ground monoacetyl-benzidine are stirred in 200 parts of water and some ice with 30 parts of hydrochloric acid of specific gravity 1.15. Into this mixture there is dropped slowly at 0–10° C. a solution of 7 parts of sodium nitrite in about 20 parts of water and when the addition of this nitrite is complete the whole is stirred for about 1 hour and then filtered.

The filtered diazo-solution is run while stirring into a mixture of 1000 parts of cold water, 53 parts of bisulfite liquor of 40 per cent strength and 20 parts of sodium carbonate. The pH of the mass thus obtained amounts to about 8 to 8.5. Stirring is continued over-night, whereupon 20 parts of acetic acid are added until the pH of the mass falls to 5 to 2.5, and the whole is then heated to about 80° C. At this temperature there are added gradually 10 parts of zinc dust and stirring is continued until the yellow solution is decolorized, whereupon it is made feebly alkaline with 32 parts of sodium carbonate and filtered hot. After filtering hot the sodium salt of the hydrazine sulfonic acid of the formula

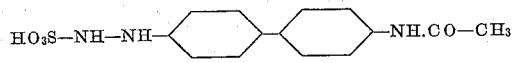

is salted out from the cool filtrate. The alkalinity of the medium of the sulfite treatment may be greater or smaller than that which corresponds to the pH 8.5, however it is not advantageous if the pH is smaller than 7 or greater than 9. Further, the zinc may be replaced by iron filings. In this case the iron is first of all separated and filtered after decolorization of the reaction mass by mixing the latter with sodium carbonate solution. The sodium salt of the hydrazine sulfonic acid may be obtained from the filtrate by salting out. It is a white crystalline mass which is colored feebly yellow on exposure to air.

The sodium salt of the hydrazine sulfonic acid of the above formula is digested for ½ hour at 65–70° C. in about 1500 parts of water and 200 parts of hydrochloric acid of specific gravity 1.15. Formation of the hydrazine hydrochloride occurs with splitting of the sulfonic group. After cooling the sparingly soluble chloride of the formula

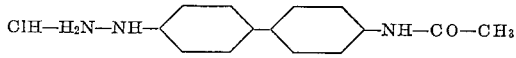

is separated. The free base of the formula

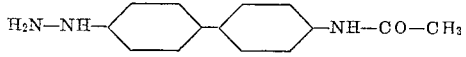

which may be liberated from the hydrochloride by careful treatment with alkalies, melts at 227° C. after recrystallization from alcohol.

When treating the hydrazine sulfonic acid instead of for ½ hour at 65–70° C. with the indicated quantity and concentration of hydrochloric acid for about 2–3 hours at 95–98° C., i. e., until everything is dissolved, there is not only saponified the sulfonic group, but also the acetylamino group.

From the hydrochloric acid solution there is obtained the hydrochloride of the hydrazine of the formula

a base which melts at 179° C. when recrystallized from alcohol.

The same final product is obtained in analogous manner when starting from monoethyl- or monomethyl-carbamate

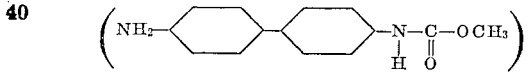

or from monopropionyl- or monobutyryl-benzidine.

*Example 2*

25.4 parts of monoacetyl-tolidine of the formula

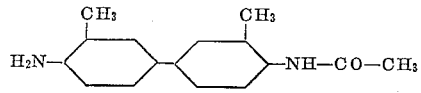

are diazotized with hydrochloric acid and sodium nitrite as indicated in the foregoing example.

The filtered diazo solution is introduced into a mixture of 63 parts of bisulfite solution containing 40 per cent of NaHSO₃ and 20 parts of sodium carbonate, about 1000 parts of water and some ice. The whole is stirred for about 12 hours and the further procedure is as indicated in Example 1, viz. decolorizing the reaction mixture after acidifying with zinc dust, and separating the sodium salt of the hydrazine sulfonic acid of the formula

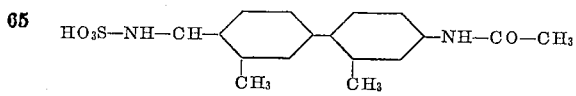

which is a white crystalline mass which becomes yellow on exposure to air. The same variations of the pH in the sulfite treatment can also be made here and the final reduction may also be effected with aid of iron.

When treated with an acid saponifying agent, for example hydrochloric acid, for ½ hour at 65–70° C. there is obtained the salt of the hydrazine of the formula

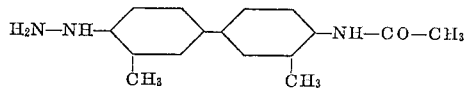

of melting point 202° C., and no longer boiling the salt of the hydrazine of the formula

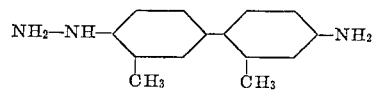

When using as parent material the mono-acetyl compound of the ortho-ortho'- or meta-meta'-dichlorobenzidine of the formula

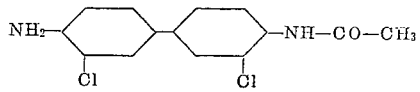

and

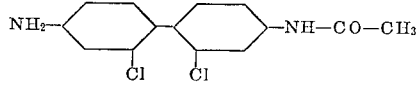

respectively, or the ortho-ortho'-dianisidine of the formula

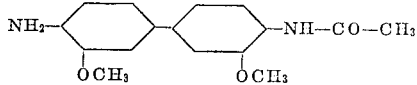

there are obtained according to the above method of working over the corresponding hydrazine sulfonic acids, the hydrazines of the formulas

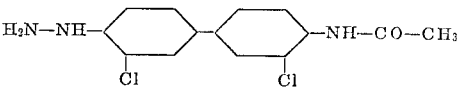

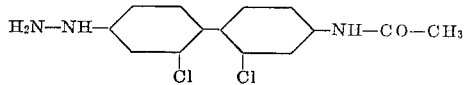

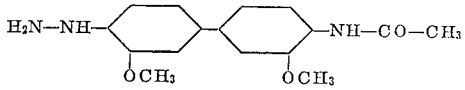

or

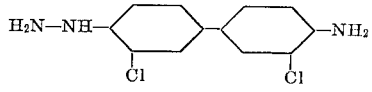

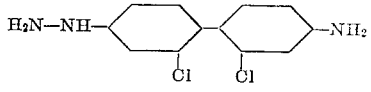

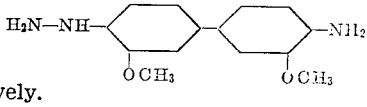

respectively.

The same final products are also obtained when using instead of the mono-acetylated diaminodiphenyl bases the other mono-acetylated bases, for instance mono-propionyl or mono-butyryl derivatives.

*Example 3*

28.8 parts of monobenzoyl-benzidine of the formula

are finely ground and diazotized as indicated in Example 1. The diazo solution is then added at about 10° C. to a mixture of 1000 parts of water, 63 parts of bisulfite solution containing 40 per cent of NHSO₃ and 20 parts of sodium carbonate. The whole is stirred for about 12 hours and the yellow sodium salt of the sulfonic acid is salted out with common salt. The filter cake is introduced into about 2000 parts of hot water and after addition of about 20 parts of acetic acid the mixture is decolorized with zinc dust. The rather sparingly soluble sodium salt of the hydrazine sulfonic acid of the formula

is separated as described in Example 1.

The separated material is introduced into about 2000 parts of hot water, to the mixture are added 200 parts of hydrochloric acid of specific gravity 1.15 and the whole is stirred for about 1 hour at 65–70° C.

The sparingly soluble hydrochloride of the base of the formula

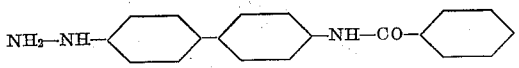

thus formed is separated when cold and used for the manufacture of pyrazolone.

*Example 4*

24.1 parts of the hydrazine of Example 1 of the formula

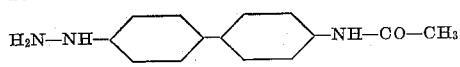

are dissolved in about 200 parts of alcohol mixed with some glacial acetic acid. There are then added 14 parts of ethyl-aceto-acetate and the mixture is boiled for about 1 hour. After cooling there are added to the mixture 20 parts of caustic soda solution of 36° Bé. and the mixture is stirred for 24 hours. By heating the larger part of the alcohol is expelled while water is substituted, the whole is filtered and pyrazolone precipitated by adding acid. It corresponds with the formula

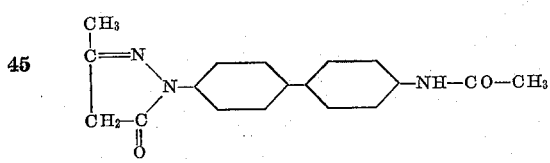

The condensation may also start from the hydrazine hydrochloride and be conducted in aqueous medium. Instead of ethylaceto-acetate any ather β-keto-carboxylic acid ester, for instance ethyl benzoyl acetate, terephthaloyl di-acetic ester, may be used, products being then obtained having for example the following formulas:

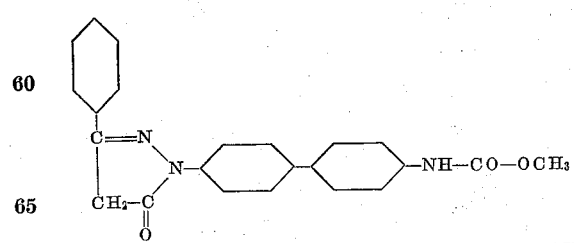

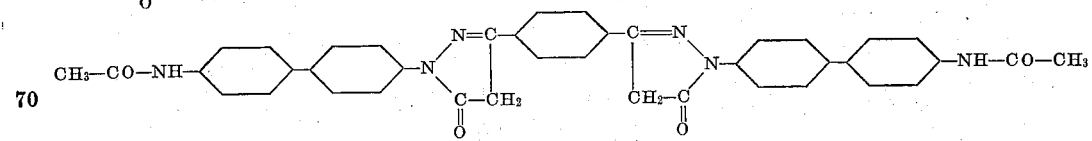

When starting from 4-hydrazines the 4′-amino groups of which may be substituted by other radicals than acetyl radicals (cf. the last paragraph of Example 1), there are obtained pyrazolones such as

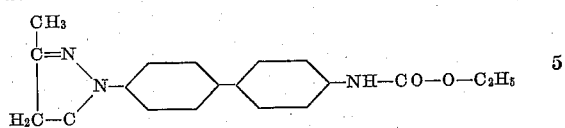

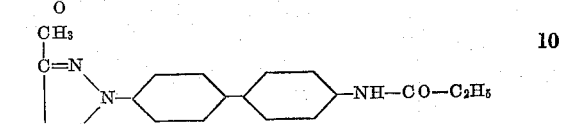

and the like.

*Example 5*

27.2 parts of the hydrochloride of the hydrazine of Example 1, last paragraph but one, of the formula

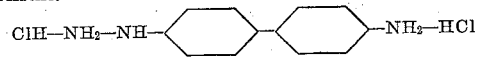

are stirred in 200 parts of water and 200 parts of alcohol. To this mixture are added 19 parts of the sodium compound of the oxalacetic acid ethylester. When the hydrazine has disappeared there are gradually added 40 parts of caustic soda solution of 36° Bé., the mixture is gradually heated to boiling and boiling is continued until the elimination of alcohol is complete. After acidifying the pyrazolone of the formula

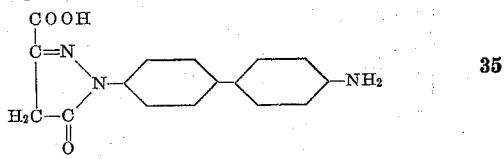

is precipitated as a yellow powder.

If after the condensation of the hydrazine with the sodium oxalacetic acid ethylester the reaction mixture is not boiled with caustic soda solution, but treated carefully with dilute sodium carbonate solution, the carboxylic acid ester group at the 3-position of the pyrazolone ring is not saponified and there is obtained a pyrazolone of the formula

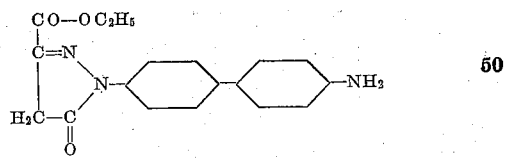

The sodium oxalacetic acid ethylester may be replaced by the corresponding methylester, whereby a pyrazolone of the formula

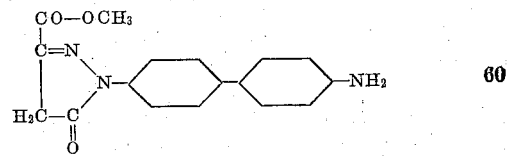

is formed. The free oxalacetic acid esters may also be used for producing these pyrazolones instead of the corresponding sodium compounds.

*Example 6*

27.2 parts of the hydrazine hydrochloride of Example 1 last but one formula, are suspended in hot water. Condensation follows with 14 parts of ethylaceto-acetate at about 60° C. with gradual neutralization of the acid liberated in the condensation. When the condensation is complete the whole is cooled, made alkaline to phenolphthalein by means of caustic alkali, stirred for 12 hours, heated until everything has been dissolved and finally the pyrazolone precipitated by neutralisation. It corresponds with the formula

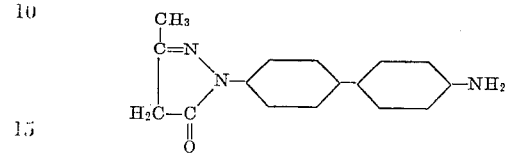

This product is a white powder of melting point 194° C., soluble in dilute caustic soda solution and dilute mineral acid.

The corresponding pyrazolone derivative from ortho-ortho'-tolidine has the formula

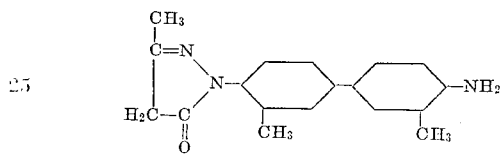

When carrying out the condensation with an acylamino hydrazine and oxalacetic acid esters under mild conditions there are obtained products such as

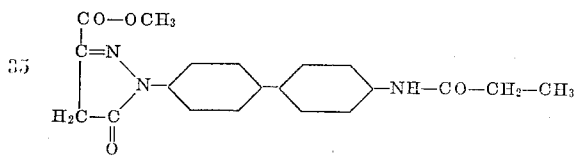

*Example 7*

34.1 parts of the hydrazine hydrochloride of the formula

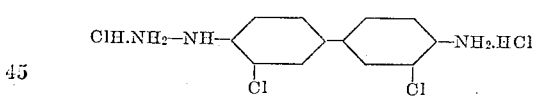

are converted as indicated in Example 5 into the pyrazolone of the formula

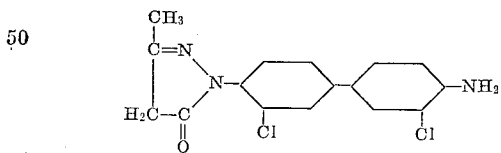

by condensation with acetoacetic ester. When replacing the acetoacetic ester by the oxalacetic acid ethylester there is obtained, after saponifying with dilute caustic soda solution, the pyrazolone carboxylic acid of the formula

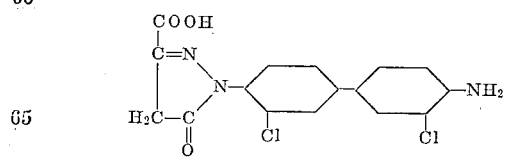

or from ortho-ortho'-dianisidine and acetoacetic ester the pyrazolone of the formula

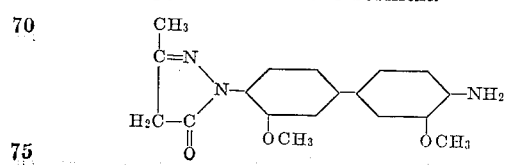

This application is a continuation-in-part of my application Serial No. 108,902, filed November 2, 1936.

What I claim is:

1. The pyrazolone derivatives of the general formula

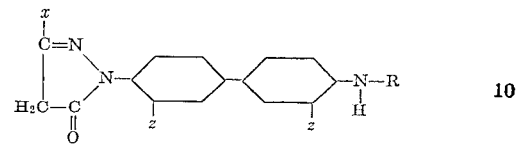

wherein $z$ stands for a member of the group consisting of H, $CH_3$, $OCH_3$ and Cl, $x$ stands for a member of the group consisting of hydrogen, methyl, $O=C-O-R_2$, $R_2$ being a member of the group consisting of H, $CH_3$ and $C_2H_5$, and phenyl, and R stands for a member of the group consisting of H and $COR_3$, $R_3$ being a member of the group consisting of H, alkyl, O—alkyl and aryl, which products are light-colored water-insoluble powders which dissolve in water with addition of alkalies and are convertible with diazo compounds into azo dyestuffs.

2. The pyrazolone derivatives of the general formula

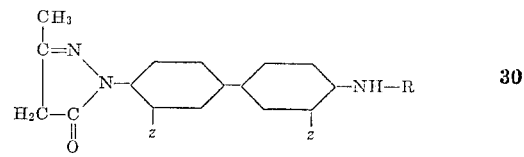

wherein $z$ stands for a member of the group consisting of H, $CH_3$, $OCH_3$ and Cl, and R stands for a member of the group consisting of H, and $COR_3$, $R_3$ being a member of the group consisting of H, alkyl, O—alkyl and aryl, which products are light-colored water-insoluble powders which dissolve in water with addition of alkalies and are convertible with diazo compounds into azo dyestuffs.

3. The pyrazolone derivatives of the general formula

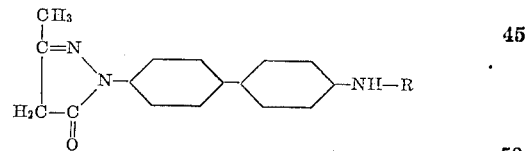

wherein R stands for a member of the group consisting of H and $COR_3$, $R_3$ being a member of the group consisting of H, alkyl, O—alkyl and aryl, which products are light-colored water-insoluble powders which dissolve in water with addition of alkalies and are convertible with diazo compounds into azo dyestuffs.

4. The pyrazolone derivative of the formula

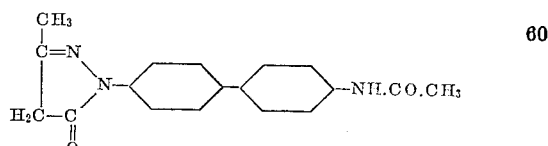

5. The pyrazolone derivative of the formula

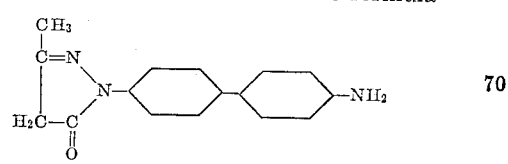

MAX SCHMID.